(12) United States Patent
Gould et al.

(10) Patent No.: US 7,636,568 B2
(45) Date of Patent: Dec. 22, 2009

(54) REMOTE AIRCRAFT MANUFACTURING, MONITORING, MAINTENANCE AND MANAGEMENT SYSTEM

(75) Inventors: Todd W. Gould, Marysville, WA (US); Steve R. Stovner, Stanwood, WA (US); Richard J. Reuter, Seattle, WA (US); Stanely W. Engdahl, Everett, WA (US); James M. Parker, Arlington, WA (US); Bryan P. Kesterson, Kent, WA (US)

(73) Assignee: The Boeing Company, Chicago, IL (US)

( * ) Notice: Subject to any disclaimer, the term of this patent is extended or adjusted under 35 U.S.C. 154(b) by 1481 days.

(21) Appl. No.: 10/307,818

(22) Filed: Dec. 2, 2002

(65) Prior Publication Data

US 2004/0106404 A1 Jun. 3, 2004

(51) Int. Cl.
*H04Q 7/20* (2006.01)
(52) U.S. Cl. .................. 455/431; 455/430; 455/98
(58) Field of Classification Search .......... 455/430, 455/431, 423
See application file for complete search history.

(56) References Cited

U.S. PATENT DOCUMENTS

| 5,974,349 A | 10/1999 | Levine |
| 6,047,165 A | 4/2000 | Wright et al. |
| 6,104,914 A | 8/2000 | Wright et al. |
| 6,108,523 A | 8/2000 | Wright et al. |
| 6,148,179 A | 11/2000 | Wright et al. |
| 6,154,636 A | 11/2000 | Wright et al. |
| 6,154,637 A | 11/2000 | Wright et al. |
| 6,160,998 A | 12/2000 | Wright et al. |
| 6,163,681 A | 12/2000 | Wright et al. |
| 6,167,238 A | 12/2000 | Wright |
| 6,173,159 B1 | 1/2001 | Wright et al. |
| 6,208,955 B1 | 3/2001 | Provan et al. |
| 6,671,589 B2 * | 12/2003 | Holst et al. ................ 701/3 |
| 2003/0003872 A1 | 1/2003 | Brinkley et al. |

FOREIGN PATENT DOCUMENTS

| DE | 199 60 394 | 5/2001 |
| WO | WO 02/065683 | 8/2002 |

OTHER PUBLICATIONS

Article, Airbus Industrie, Onboard Maintenance System (OMS), pp. 45-1-45-3 Dated Jan. 27, 2000.
Partial European Search Report and Annex to the European Search Report, May 26, 2004 (4 pgs).

* cited by examiner

*Primary Examiner*—Temica M Beamer
(74) *Attorney, Agent, or Firm*—Harness, Dickey & Pierce, P.L.C.

(57) ABSTRACT

An aircraft wireless data communication system includes an aircraft computer/server in communication with a plurality of aircraft systems. Access to the aircraft systems via the computer/server is available in real-time via wireless communication with a ground-based computer system. The ground-based computer system includes a computer that can be accessed from one or more networks of computers. Each authorized computer user on an airline, manufacturer, or supplier network has remote real-time access to the aircraft computer/server. Properly authorized remote users can: perform comparisons between the aircraft actual configuration identity and an aircraft authorized configuration identity; perform system diagnostic testing; view system status and parameters; collaborate with users from local and remote organizations using real-time aircraft data; and upload and download software and data to and from aircraft systems.

14 Claims, 11 Drawing Sheets

REMOTE AIRCRAFT MANUFACTURING, MONITORING, MAINTENANCE AND MANAGEMENT SYSTEM

FIELD OF THE INVENTION

The present invention relates to information systems which collect, manage, process, and transfer data, and more specifically to a mobile platform and ground information system to manage, process, and wirelessly communicate data both to and from a mobile platform (e.g. aircraft, ship, automobile, train, spacecraft).

BACKGROUND OF THE INVENTION

Modern mobile platforms have an increasing volume of electronic and software driven systems controlled or partially operated by computers and computer software. Most mobile platforms have no capability for remotely managing and maintaining system configuration. Further, the collection and communication of a mobile platform's system(s) data for use in remotely managing and maintaining the mobile platform during the manufacturing process is beyond the capability of today's mobile platform systems. Some mobile platforms now have the onboard capability of collecting system data for monitoring. This data can be removed to a ground-based facility for later after-the-fact health assessment (e.g. diagnostics and trend analysis). Some mobile platforms have the capability to transmit a limited amount of this data to ground-based facilities while in motion. The capability to troubleshoot problems from remote locations is very limited.

The present invention can apply to any mobile platform with computer systems. In the description below, an aircraft is used as an example of a mobile platform. The aircraft industry processes, organizations, and regulatory requirements are used to explain the invention. Very similar processes and implementations can be applicable to other mobile platforms Commercial airlines are required to retain and maintain an authorized configuration of each aircraft. An aircraft's configuration is herein defined as the identity of each software and hardware part used on the aircraft. An authorized configuration of each aircraft is required in order for the aircraft to be flight approved by regulatory bodies. The configuration identities of the aircraft; both that which is captured on engineering renderings, herein defined as the authorized configuration identity; and a current parts listing of the physical aircraft, herein defined as the actual configuration identity; are in a constant state of flux due to maintenance and engineering activities. Reconciliation of these two configuration identities is presently difficult. Most of the information providing the authorized configuration identity of each aircraft is now rendered in hard copy form, i.e., as a document set, which is revised and maintained by the airline operating the individual aircraft. An initial version of the authorized configuration identity for each aircraft is provided by the aircraft manufacturer, and is thereafter updated by the airline as changes to the aircraft authorized configuration identity are made.

The disadvantage of the present system of managing each aircraft's configuration is that the authorized and actual configuration data is not available to all personnel requiring the information. The latency, manual nature and the logistics of the update process is error prone. The required aircraft authorized configuration identity information is therefore difficult to maintain and use. A total electronic version of the aircraft authorized and actual configuration identities are not presently available. Further, where the electronic version of the actual configuration identity does exist, it does not contain many of the parts actually existing on the aircraft. Reconciliation of these two identities is manpower intensive and logistically difficult.

Another disadvantage of the present system of managing an aircraft's configuration is the logistics problems associated with the location, number, and type of software parts that must be available. Some aircraft have software parts stored on one or more mass storage devices. Software parts are also retained in one or more ground-based locations. Aircraft software is also stored on diskettes and other media onboard the aircraft in binders. The variety of types and locations of these software and media parts compound the problem of maintaining up-to-date inventories of aircraft software on and off the aircraft.

Software changes are commonly made on an aircraft by first loading new software parts onto a physical media, e.g., a CD ROM, or a diskette. The physical media must then be transported to the location of the aircraft for the software to be loaded on the individual aircraft. The disadvantage of this system is that changes to the aircraft's software cannot be made any faster than the process that delivers the physical media between the supplier and ultimately to the individual aircraft A further disadvantage of the present infrastructure both on and off aircraft is that airline operators, suppliers, and manufacturers have little or no access to the systems and the data on each individual aircraft. A person or persons must physically go to the aircraft, wherever the aircraft is located in the world, and gather data to resolve problems. Typically, these parties must contact either an airline maintenance group or an engineer working for the aircraft manufacturer or designer in order to obtain other data. Often, the manufacturer's and supplier's personnel must travel to the aircraft to obtain data to solve the problem. The problem solution may require making either hardware or software changes to the physical aircraft. The new actual configuration identity must then be verified and a quality control step conducted to confirm that the changes made are proper. Each of these activities adds to the cost of maintaining an aircraft and increases the delay time in updating the physical aircraft or correcting problems.

A need therefore exists for a system which provides electronic transfer of information to and from each individual aircraft which also provides real-time access to a greater number of people in the information stream. A need also exists for a paperless, totally electronic system to simplify configuration assessment and modifications, to accomplish systems monitoring, maintenance, management, and manufacturing.

SUMMARY OF THE INVENTION

According to a preferred embodiment of the present invention, an aircraft hardwired or wireless data communication system is provided. In a preferred embodiment, the system provides an aircraft mounted computer/server in communication with a plurality of aircraft systems. The computer/server collects, stores and/or distributes the aircraft hardware and software actual configuration identity. The computer/server also stores the loadable software parts. The aircraft actual configuration identity is accessible in real-time via the computer/server. The data communication system ties the computer/server to the ground-based computer systems via at least one transceiver, modem, and/or antenna of the aircraft. By remotely accessing the computer/server, an authorized system user can schedule maintenance operations, query the actual configuration identity of the aircraft, monitor systems' parameters and status, run some system tests, load software to update the aircraft system functionality, make log book entries, and manage the physical aircraft.

Access to the computer/server is provided by hardwired or wireless communication with a ground-based computer system. The ground-based computer system can be a single computer or a plurality of linked computers/computer systems. In one preferred embodiment, the ground-based computer system is accessed by a plurality of organizational computer systems. Organizational computer systems can include a single computer or a plurality of linked computers/computer systems. Each organizational computer system has remote real-time access to the aircraft mounted computer/server. The system of the present invention provides that a plurality of remote users can access the aircraft mounted computer/server to manage in real-time the operational status and configuration of the aircraft systems. These computers also have access to ground-based manufacturing data, maintenance data, authorized configuration data, and mission information.

Users as defined herein can include any person or software program (agent) granted access to the system of the present invention. Each user will require an authorization to access the system of the present invention. A data manager known in the art is used to control access to the system of the present invention. A user can submit one of a plurality of commands to the computer/server of the present invention, including software loading commands, system functional test commands, maintenance information input or withdrawal commands, other data withdrawal commands, log book entry commands, and system monitoring commands.

The system of the present invention provides remote, real-time access to specific hardware installed in an aircraft. For each hardware part identified by known electronic part number placards, the system of the present invention provides remote access to the aircraft's hardware identity. Any deviation between an actual configuration identity versus the authorized configuration identity of the aircraft is ascertained by performing a comparison of the authorized aircraft configuration identity obtained from the ground against the actual configuration identity, both of which are remotely accessible. Also, if a change to the authorized configuration identity is required, the new authorized configuration identity provided by one of the ground-based computers is compared to each aircraft's actual configuration identity to determine which aircraft have incorporated the authorized change.

System software and data updates are remotely sent to the computer/server on the aircraft. Using one or more of the individual ground-based computers provided in the system, an authorized user can remotely move new software and data to the aircraft, initiate an installation of software and data, and interrogate the aircraft for the most current actual configuration identity.

Using one or more of the individual ground-based computers provided in the system, an authorized user has access to the aircraft systems to view and analyze real-time and on board collected system data, and perform system status checks and testing. The system of the present invention also permits more than one authorized user to remotely access aircraft systems and simultaneously perform system status checks and testing. For example, this permits both engineering personnel and maintenance personnel to simultaneously access an aircraft's system status and real-time signal data, even if the aircraft is in flight, to identify and resolve problems.

Data forwarded to the aircraft using the system of the present invention is stored in a computer/server onboard the aircraft. Any software or data affecting flight systems or operating system controls of the aircraft is temporarily isolated from the operational systems of the aircraft by an electronic firewall known in the art. An existing set of interlocks, e.g., aircraft on the ground, wheels stopped, or engines shut off, satisfy safety requirements which must be met before software or data can be transferred into and modify the systems of the aircraft.

Information is transmitted from the ground-based computer via wireless communication signals which are forwarded to the aircraft. If the aircraft is out of direct path range of the ground-based computer, a satellite system can also be used to relay the information directly to an in-flight or remotely stationed aircraft. The ground-based computer is connected via either wired, or wireless secure communication lines and/or via a secure Internet connection to the individual users. A security system, known in the art, is employed to prevent unauthorized access and or alteration of the software and/or data sent on all transmission paths identified herein.

Further areas of applicability of the present invention will become apparent from the detailed description provided hereinafter. It should be understood that the detailed description and specific examples, while indicating a preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
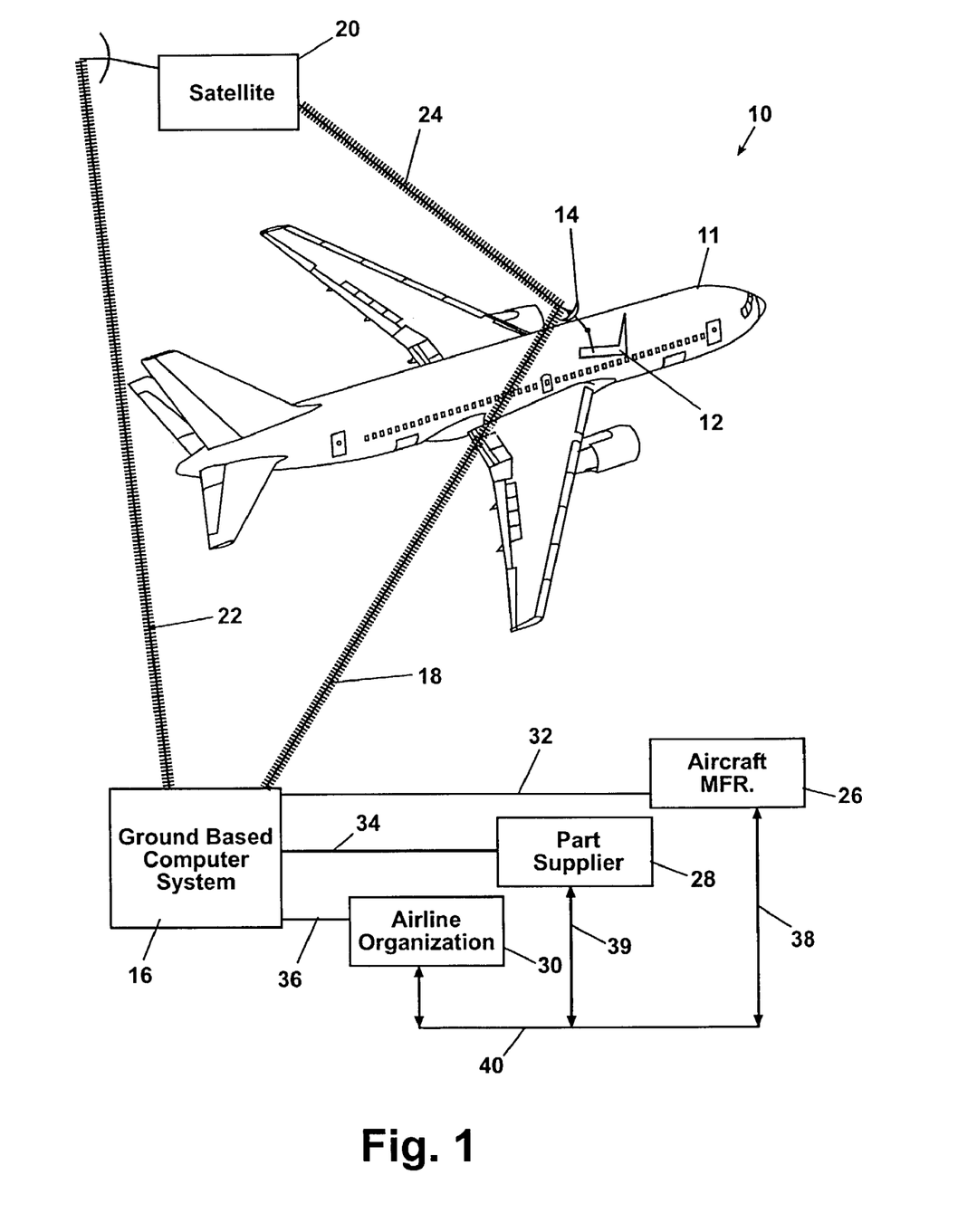
FIG. 1 is a block diagram of a preferred embodiment of the present invention.

Referring to FIG. 1, a remote aircraft manufacturing, monitoring, maintenance and management (RAM) system 10 in accordance with a preferred embodiment of the present invention is shown. The RAM system 10 provides in an aircraft 11 a computer/server 12 (i.e., a computer and server). The computer/server 12 is in wireless communication through an aircraft transceiver/antenna 14 with a ground-based computer system (GBCS) 16 along a wireless signal path 18. The GBCS 16 can be a single computer or multiple linked computers and/or servers. As known in the art, the computer/server 12 as defined herein can be: a stand-alone computer such as a personal computer; a portable, e.g., laptop computer; an aircraft installed computer module; or a monitor providing input/output capability remotely operating from a separate computer unit. If the aircraft 11 is not in a direct line signal communication path with the GBCS 16, Communication can be relayed via a satellite 20 (via a ground-satellite signal path 22 and a satellite-aircraft signal path 24). This provides two-way wireless communication between the aircraft 11 and the GBCS 16 for any location of the aircraft 11 in the world, whether the aircraft is in flight or on the ground.

The GBCS 16 can be a stand-alone computer or a network of computers. The GBCS 16 in turn communicates with at least one organizational computer system at one or more of the following exemplary locations: an aircraft manufacturer 26, a part supplier 28, an airline organization 30, and additional, i.e., third parties (not shown) through each of a plurality of signal paths. Each signal path can be an Internet signal path, an individual local area network (LAN) signal path, hardwired, or a wireless signal path. The aircraft manufacturer 26 is shown in communication with the GBCS 16 along an exemplary signal path 32. The part supplier 28 is shown in communication with the GBCS 16 along a signal path 34. The airline organization 30 is shown in communication with the GBCS 16 along a signal path 36. Each of the individual organizational computer systems, e.g., the aircraft manufacturer 26, the part supplier 28, and the airline organization 30 are in communication with other organizational computer systems along a signal path 38, a signal path 39 and a signal path 40, respectively.

Personnel onboard an aircraft 11 in flight or at a remote facility can evaluate a problem and receive real-time data from one or more aircraft systems of the aircraft 11 using the RAM system 10 of the present invention. Software programs (not shown) are also required on the aircraft 11 and at the GBCS 16 to properly secure and use the system of the present invention.

Figure 2:
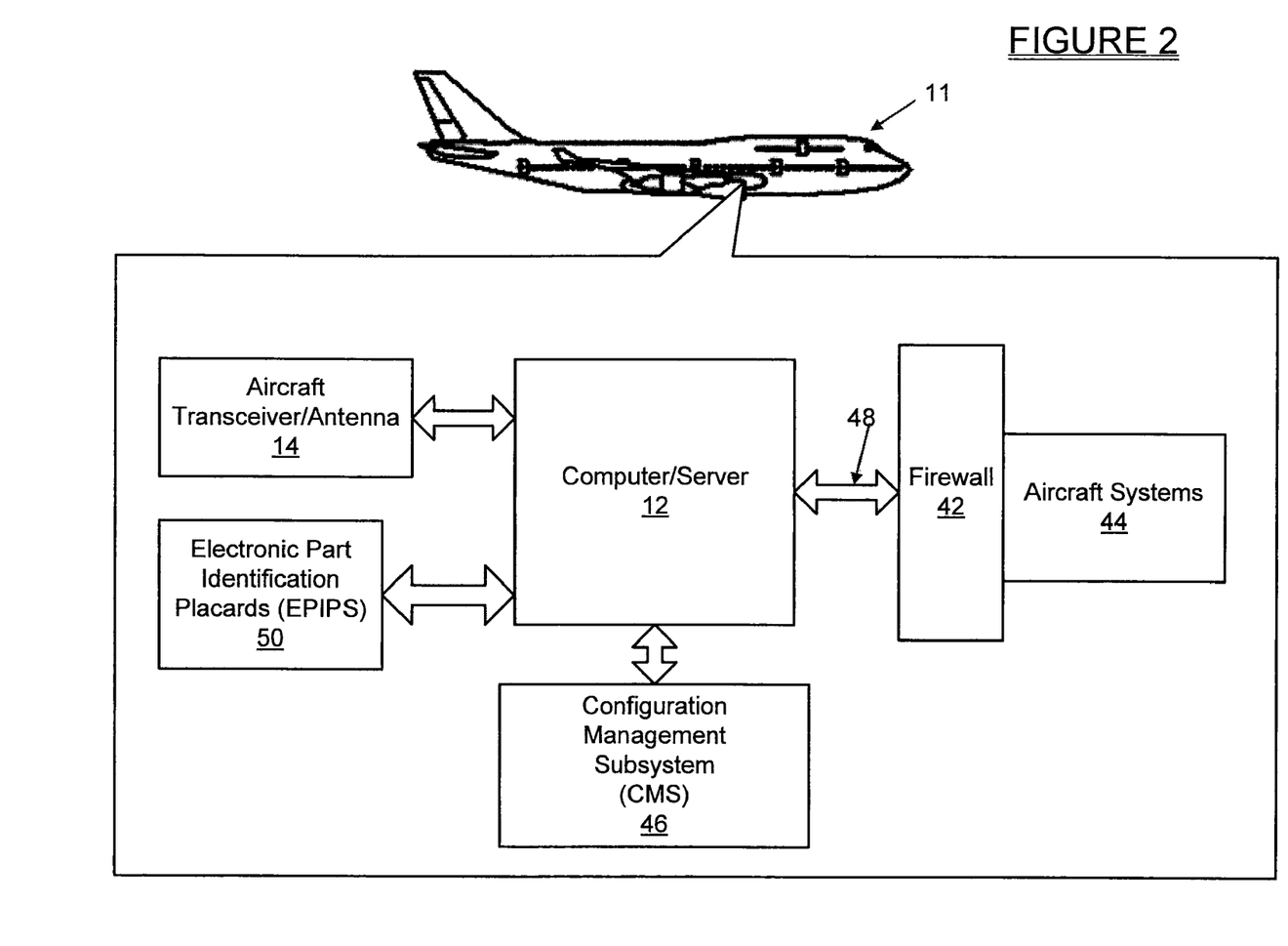
FIG. 2 is a perspective view of an aircraft showing the aircraft located computer of the present invention, and its interface with both the electronic firewall and the aircraft system of the aircraft.

Referring now to FIG. 2, within the RAM system 10, the computer/server 12 which is located on the aircraft 11 is isolated by an electronic firewall 42 from each of a plurality of aircraft systems 44. The aircraft systems 44 provide control of the aircraft during flight. The software parts and data contained in the computer/server 12 are not permitted to be overwritten into the aircraft systems 44 until certain conditions of the aircraft 11 are met. These conditions or interlocks normally include requirements such as the aircraft 11 being on the ground. Other requirements can also be invoked for the set of interlocks. A configuration management subsystem (CMS) 46 is preferably provided within the computer/server 12, but is shown separate in FIG. 2 for clarity. The CMS 46 will be discussed further herein with reference to FIG. 9.

By using permissible signals through the electronic firewall 42, it is also possible for the aircraft 11, while in flight, to provide, along one of a plurality of electronic busses 48, signals between the aircraft systems 44 and the computer/server 12. These signals can be routed to the computer/server 12 for dissemination via the signal paths shown in FIG. 1. The RAM system 10 of the present invention is therefore capable of providing a real-time remote display of the operating parameters of the aircraft 11.

Any aircraft system of the aircraft systems 44 may be tied into the computer/server 12. Exemplary systems which may be accessible by the computer/server 12 include: flight controls; engine controls; autopilot; navigation; electrical; hydraulics; pneumatics; and water waste. Real-time signal data and health status of each of these systems is available using the system of the present invention. Diagnostic tests and manufacturing activities can also be performed provided the interlock requirements are met. Software revisions can also be uploaded for any of the systems connected with the computer/server 12. Older aircraft can be fitted with a system of the present invention but may have limited functionality. On any aircraft having at least one electronic or software loadable system, or hardware electronic identification placards, the RAM system 10 of the present invention can be used to collect real-time diagnostic, configuration, or other data and can be used to send software parts or data to the aircraft.

The computer/server 12 can also be linked to a plurality of electronic part identification placards (EPIPs) 50. The EPIPs 50 are known in the art and identify via individualized part numbers that specific non-computer based hardware components are installed on the aircraft 11. The information from the plurality of the EPIPs 50 is therefore also available to the computer/server 12 for transmission from the aircraft 11 to the GBCS 16 shown in FIG. 1. This collection of information forms a part of the aircraft's hardware actual configuration identity (ACI).

A combination of data including the configuration of all software and data on the aircraft 11 (i.e., the software ACI), and the individual parts identified by the plurality of EPIPs 50 and electronic hardware reports (i.e., the hardware ACI) form an aircraft actual configuration identity (AACI) of the aircraft 11. The AACI can be obtained by any authorized user of the RAM system 10 of the present invention using at least one of the plurality of individual computers shown in FIG. 1. The AACI can then be compared to its authorized configuration identity which is normally stored in both the aircraft computer/server 12 and in organizational computer systems (shown in FIG. 8) of the aircraft manufacturer 26 and/or the airline organization 30 (shown in FIG. 1). A remote real-time or near real-time comparison between the AACI and the authorized configuration identity of the aircraft can be performed any time the aircraft 11 electronic systems are operating and the computer/server 12 is available.

Figure 3:
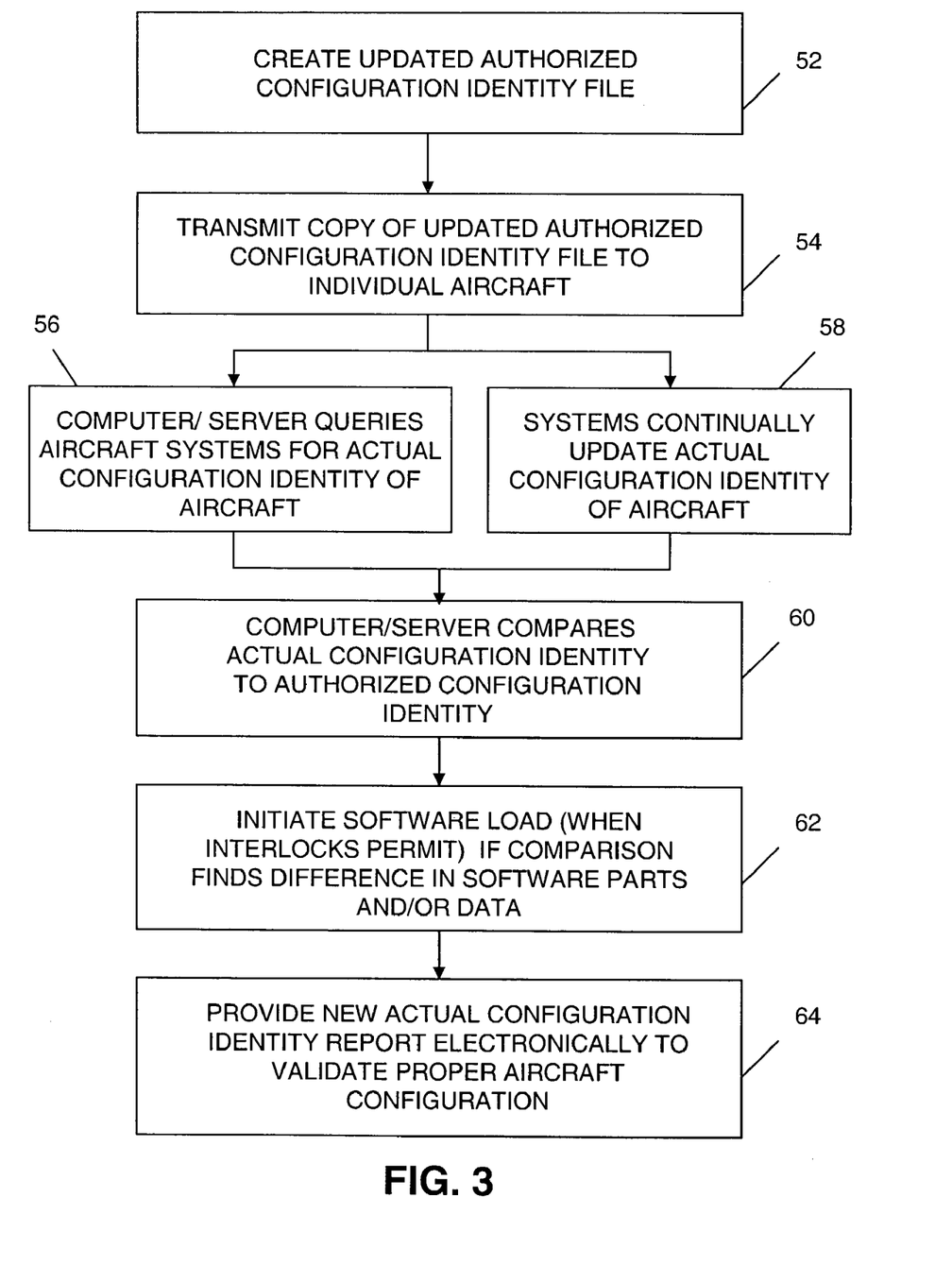
FIG. 3 is a block diagram identifying the steps to load, interrogate and update an aircraft configuration using the system of the present invention.

Referring to FIG. 3, a sequence of steps is shown to update an aircraft's physical software configuration. At a creation step 52, an updated aircraft authorized configuration identity is loaded into an aircraft authorized configuration identity file. At a transmission step 54, the updated authorized configuration identity file is transmitted to an individual aircraft. At a query step 56, a system user or software program initiates a query through the aircraft computer/server for the actual configuration identity. At a parallel update step 58, similar to step 56, the aircraft systems continually update their actual configuration identities on the aircraft's computer/server. At a comparison step 60, the new authorized configuration identity is compared to the aircraft actual configuration identity generated in step 56. At a reconfiguration step 62, if the comparison performed in the comparison step 60 identifies that a difference exists between the authorized configuration identity of the aircraft and the actual configuration identity of the aircraft, the aircraft data load system of the present invention reconfigures the aircraft system(s) based on the authorized configuration identity of the aircraft, when the aircraft interlock system permits. The updated software parts or data stored in the aircraft computer/server are overwritten into the aircraft systems of the aircraft during this step. At a verification step 64, a quality control verification is electronically performed to validate that all the aircraft system(s), including the modified systems, conform with the authorized configuration identity of the aircraft.

Figure 4:
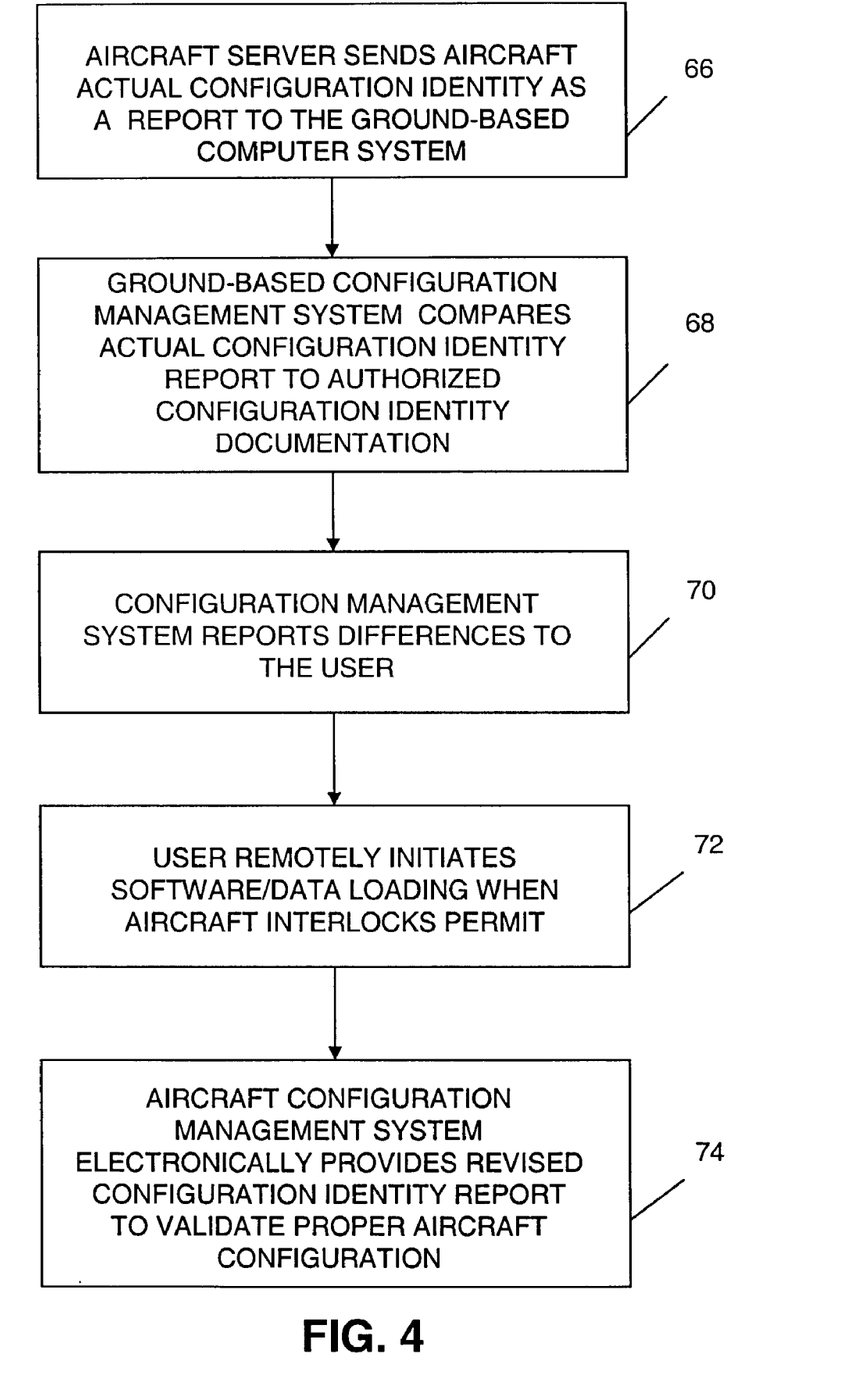
FIG. 4 is a block diagram of another embodiment of FIG. 3 showing alternate steps to load, interrogate and update an aircraft configuration.
Figure 5:
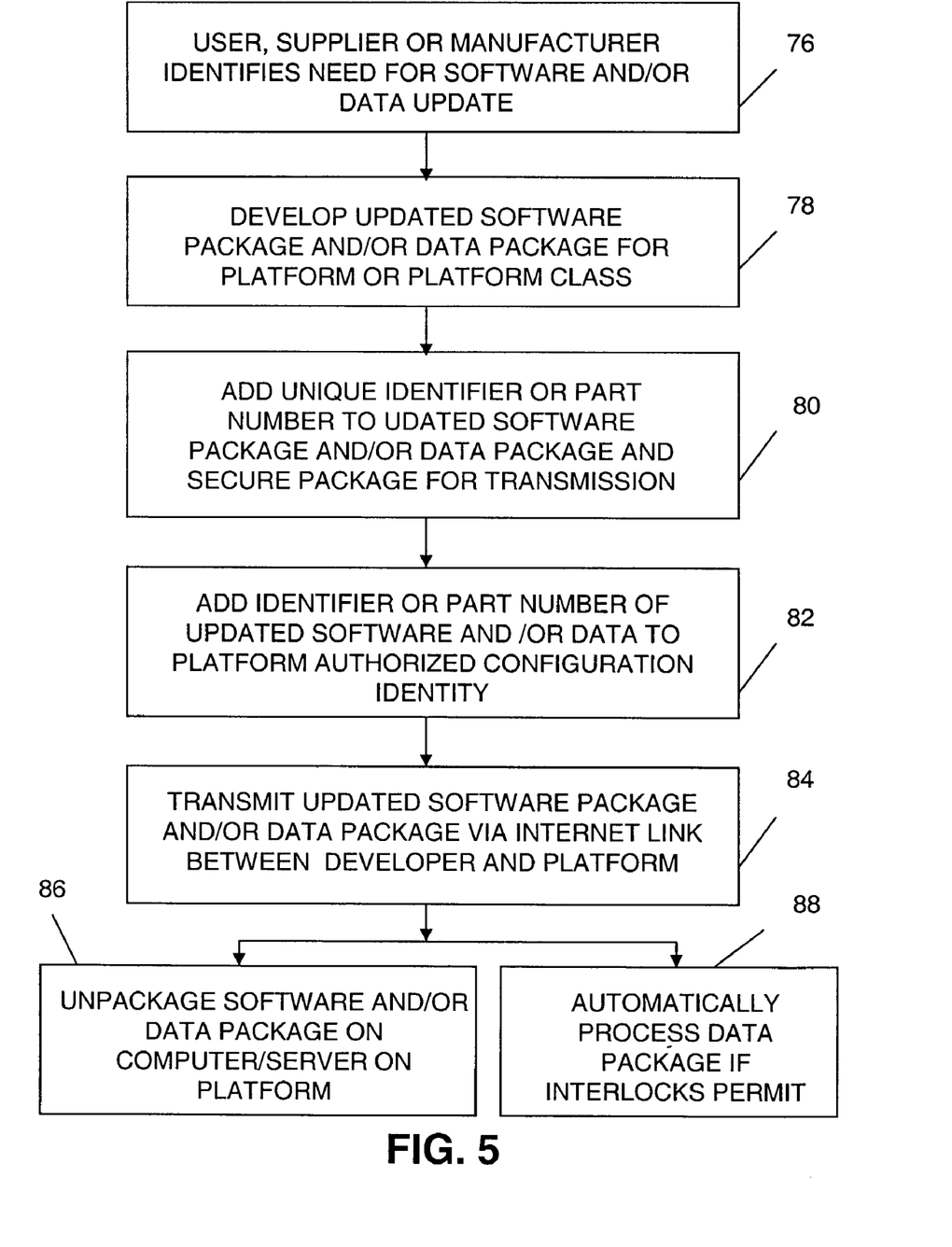
FIG. 5 is a block diagram identifying the steps a software supplier or manufacturer would take to prepare and upload a software modification to an aircraft using the system of the present invention.

Referring to FIG. 4, another embodiment for a software update procedure of the present invention is shown. At a sending step 66, at the request of an authorized system user, the AACI is transmitted by the computer/server to the GBCS as a report. At a comparison step 68, the ground configuration management system of the GBCS compares the AACI report to the authorized configuration identity documentation in the GBCS to determine if any differences exist. At a reporting step 70, differences identified in step 68 are reported by the GBCS to the user. At an initiation step 72, the user can remotely initiate software or data loading if the aircraft interlock system permits, or store the software or data in the on-board computer/server for later loading. At a validation step 74 the aircraft configuration management system electronically provides a revised AACI report for off aircraft validation Referring to FIG. 5, the steps to identify, develop, and transfer a software or data item using the RAM system 10 of the present invention are detailed. At an identification step 76, a user, supplier or manufacturer identities to a software supplier a need for a software and/or data update. At a development step 78, the software supplier develops an updated software and/or data package for an aircraft. At an item identification/part numbering step 80, a unique part number or identifier is added to the software or data package to uniquely identify the software or data package from all other packages. The package is then secured for transmission. At step 82 the identifier or part number from step 80 is added to the aircraft authorized configuration identity. In a transmission step 84 the updated software or data package is provided directly to the aircraft computer/server for storage and future use. At an un-packaging step 86, a software program un-packages, verifies, and stores the updated software or data package on the aircraft computer/server. In an alternate step 88 data package processing is automatically performed if aircraft interlock systems permit. In another preferred embodiment of the present invention, the updated software or data package is transmitted first to a quality control center (as known in the art) of either the aircraft manufacturer or airline where the package and its contents are validated, tested and verified to conform to appropriate aircraft industry standards. After verification and testing, the software or data package is then transmitted to the aircraft computer/server for storage and future use.

Figure 6:
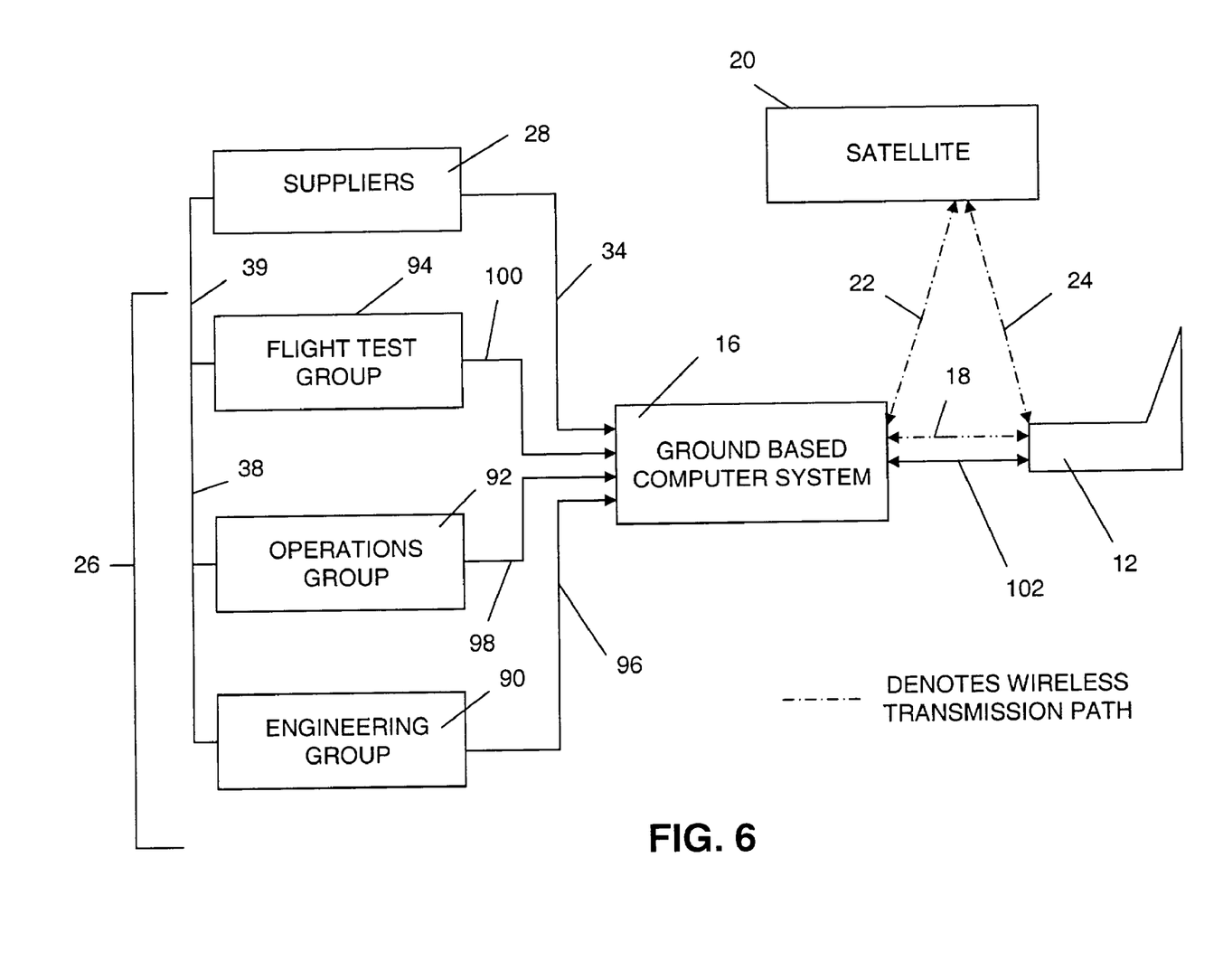
FIG. 6 is a block diagram of an exemplary aircraft manufacturer's connections to and use of the system of the present invention.

Referring now to FIG. 6, exemplary organizational computer systems connecting the aircraft manufacturer 26 and one or more part suppliers 28 (shown in FIG. 1) to the GBCS 16 and to the computer/server 12 are shown in greater detail. The aircraft manufacturer 26 can use one or more organizational computer systems to interact with one or more internal groups (e.g. an engineering group 90, an operations group 92, and/or a flight test group 94). The engineering group 90 computer systems are connected to the GBCS 16 by at least one signal path 96. The operations group 92 computer systems are connected to the GBCS 16 by at least one signal path 98. The flight test group 94 computer systems are connected to the GBCS 16 by at least one signal path 100. As previously noted in reference to FIG. 1 the one or more part suppliers 28 are connected to the GBCS 16 by at least one signal path 34 and are connected to each organization of the aircraft manufacturer 26 by the signal path 38 and the signal path 39. In a preferred embodiment of the present invention, the signal paths 38 and 39 are Internet data transmission paths.

The aircraft manufacturer 26 and/or the part supplier 28 users, either on board an aircraft or at a remote facility, can collaboratively evaluate a problem using real time data from one or more systems of the aircraft 11 (shown in FIG. 1) or ground systems of the aircraft manufacturer 26, and/or the part supplier 28 using the system of the present invention. Remote connection of the aircraft manufacturer 26 and/or the part supplier 28 to the computer/server 12 is possible by direct transmission between the GBCS 16 to the computer/server 12 via the wireless signal path 18, or by wireless signal transmission via the satellite 20 along the ground-satellite signal path 22 and the satellite-aircraft signal path 24 previously discussed in reference to FIG. 1. A hardwired transmission path 102 can also be connected between the GBCS 16 and the computer/server 12, when the aircraft is on the ground, in place of the wireless signal path 18.

Figure 7:
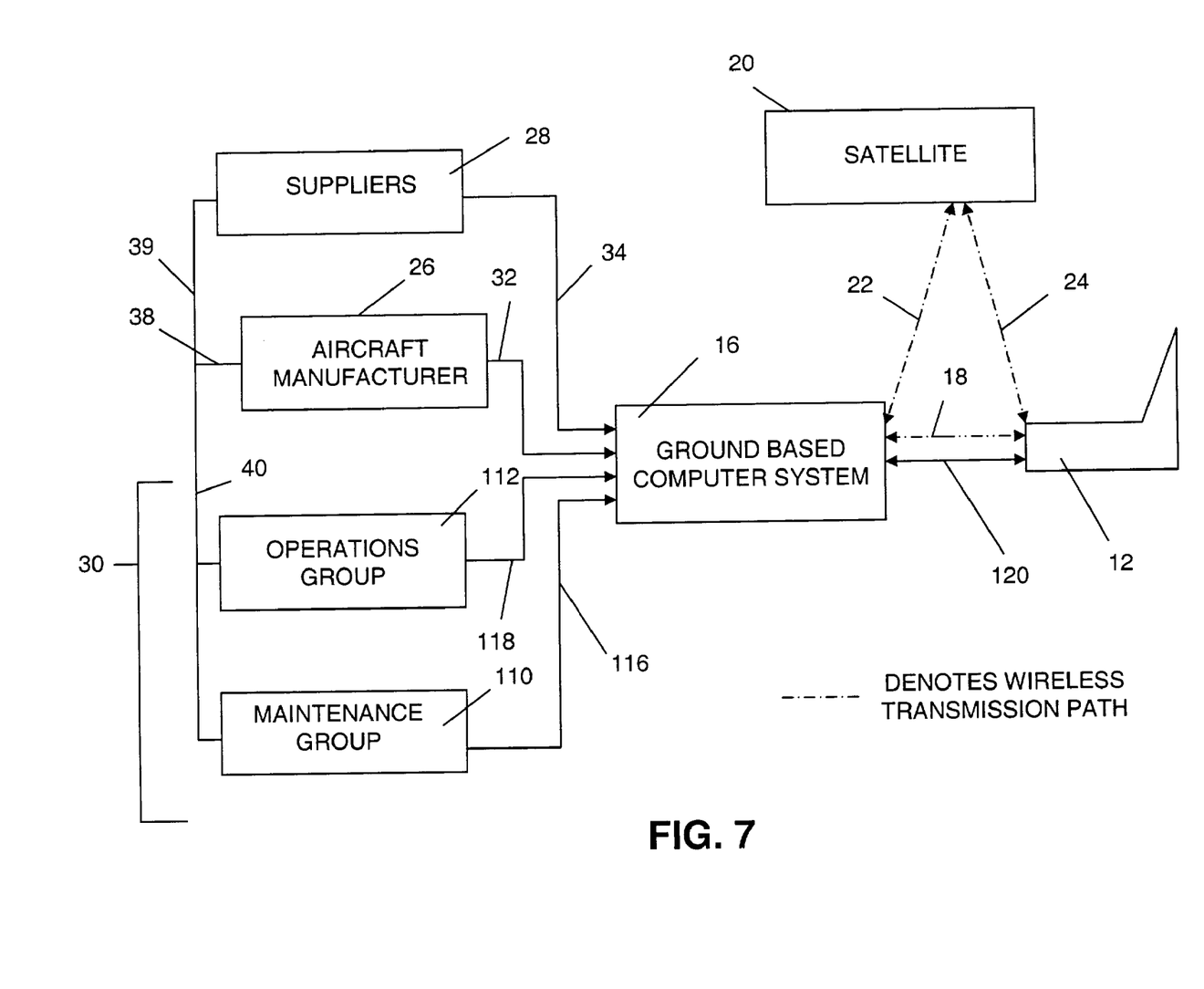
FIG. 7 is a block diagram of an exemplary aircraft operator's connections to and use of the system of the present invention.

Referring to FIG. 7, exemplary organizational computer systems connecting the airline organization 30, one or more part suppliers 28, and the aircraft manufacturer 26 (shown in FIG. 1) to the GBCS 16 and to the computer/server 12 of the present invention are shown in greater detail. The airline organization 30 can use one or more organizational computer systems to interact with one or more internal groups (e.g. a maintenance group 110, and/or an operations group 112). The maintenance group 110 computer/servers are connected to the GBCS 16 by at least one signal path 116. The operations group 112 computer/servers are connected to the GBCS 16 by at least one signal path 118.

As previously noted in reference to FIG. 1, the one or more part suppliers 28 and the aircraft manufacturer 26 can be connected to the GBCS 16 by at least one signal path and are connected to each of the airline organizations 30 by the signal path 39 and the signal path 40. In a preferred embodiment of the present invention the signal paths 39 and 40 are Internet data transmission paths. Airline organization 30 users and/or part supplier 28 users and/or aircraft manufacturer 26 users, either onboard an aircraft or at a remote facility, can collaboratively evaluate a problem using real-time data from one or more systems of the aircraft 11 (shown in FIG. 1) or ground systems of the airline organization 30, and/or the part supplier 28, and/or the aircraft manufacturer 26 using the system of the present invention. Remote connection of the airline organization 30 and/or the part suppliers 28, and/or the aircraft manufacturer 26 to the computer/server 12 is possible by direct transmission between the GBCS 16 to the computer/server 12 via the wireless signal path 18, or by wireless signal transmission via satellite 20 along the ground-satellite signal path 22 and the satellite-aircraft signal path 24 previously discussed in reference to FIG. 6. A hardwired transmission path 120 can also be connected between the GBCS 16 and the computer/server 12, when the aircraft is on the ground, for a signal path in place of the wireless signal path 18.

Figure 8:
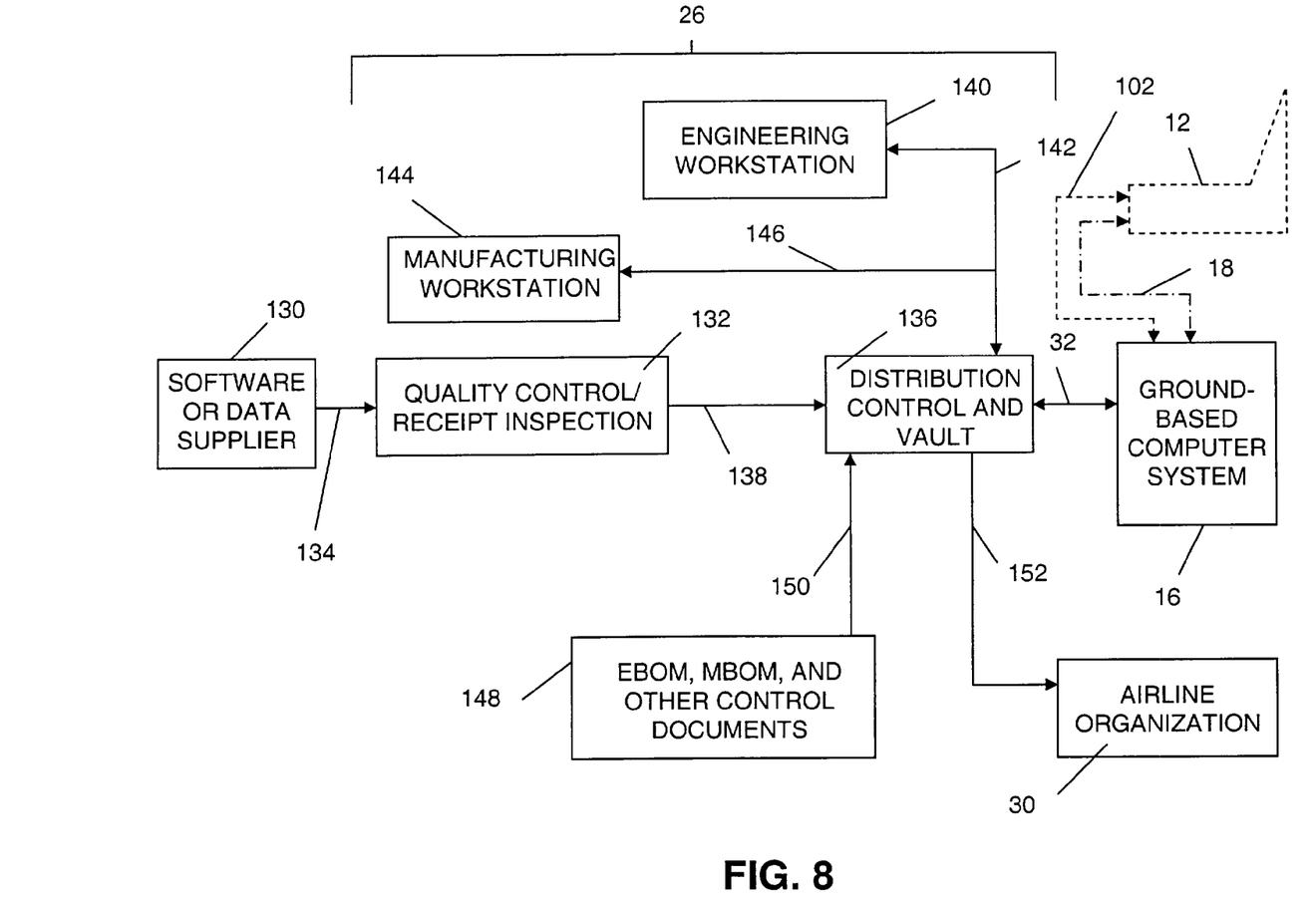
FIG. 8 is a block diagram of an exemplary aircraft manufacturer's software and data distribution system of the present invention.

Referring to FIG. 8, an exemplary flow path for software or data items which are provided by a software supplier is shown. The software/data supplier 130 develops a new software or data item, packages the software or data item and transmits this package to a quality control or receipt inspection group 132 which is part of the aircraft manufacturer 26 identified in FIG. 1. The software package is transmitted via a signal path 134. The quality control or receipt inspection group 132 is connected to a distribution control and vault 136 via a data transfer line 138. Software or data packages can be electronically transferred to any of a plurality of workstations (e.g. engineering workstations 140 via a data transfer line 142, and/or of manufacturing workstations 144 via a data transfer line 146).

A distribution and control function of the distribution control and vault 136 controls distribution of software and data packages based on engineering bill of materials (EBOMs), manufacturing bill of materials (MBOMs) and/or other control documents 148. The EBOM, MBOM and/or other control documents 148 can be packaged and distributed by the distribution control and vault 136 via a data transfer line 150 or to various locations (e.g. engineering workstations 140, manufacturing workstations 144, and/or the aircraft's computer/server 12). The software or data package can also be transmitted from the distribution control and vault 136 to the airline organization 30 via a signal path 152.

Figure 9:
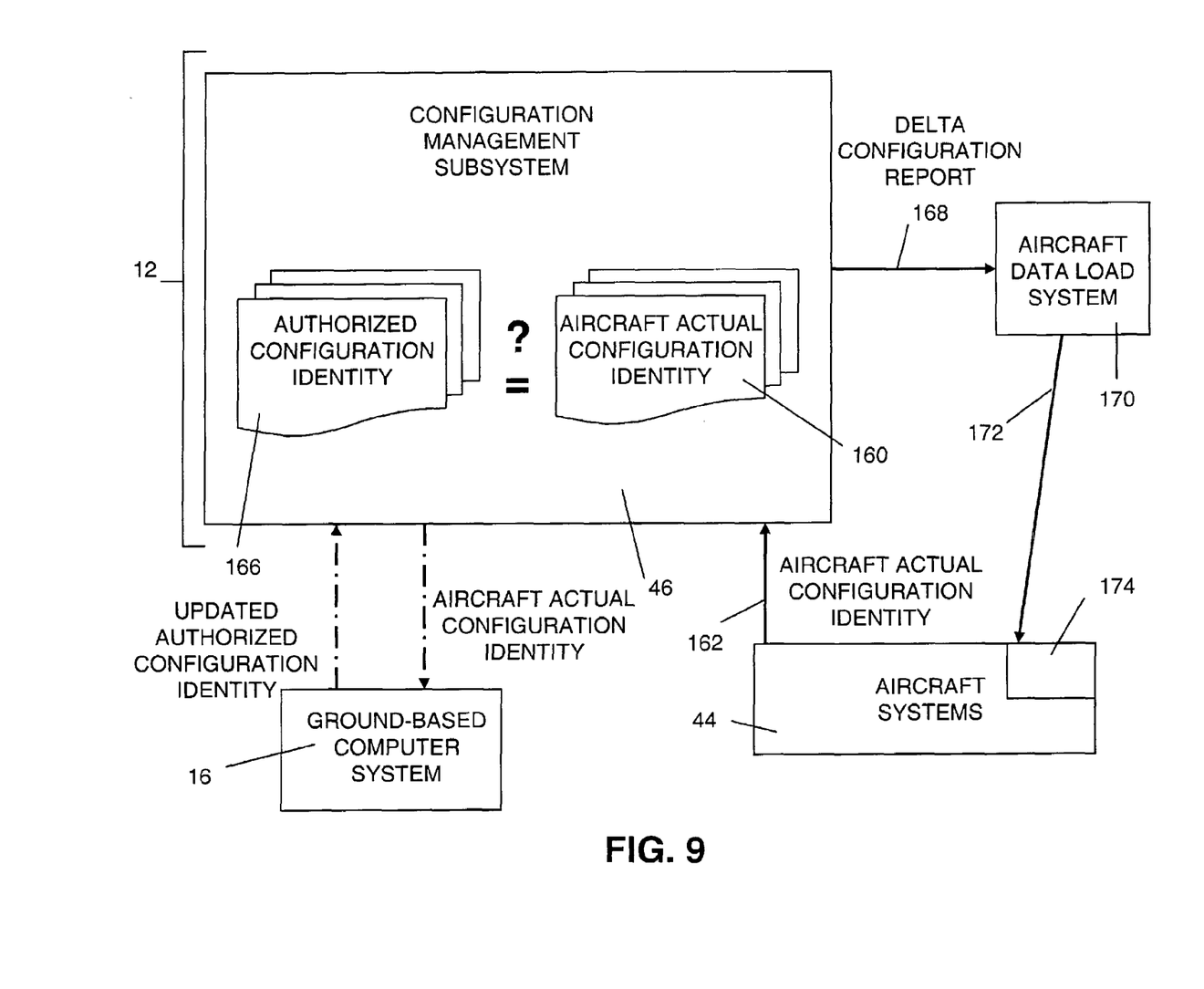
FIG. 9 is a block diagram of the present invention detailing a flow path to compare an authorized configuration identity to an actual configuration identity of an aircraft, predisposing software loading of aircraft systems.

Referring to FIG. 9, a preferred embodiment of the present invention identifies the hardware and software used for configuration management and software load operations whose operation steps were described in reference to FIGS. 3 and 4. An actual aircraft configuration identity (AACI) 160 is collected by the CMS 46 from the aircraft systems 44 along a data transfer line 162. A remote user can access the AACI 160 via the GBCS 16. The remote user can determine whether a configuration change needs to be made. If an update is required, an updated authorized configuration identity 166 is packaged and sent through the GBCS 16 to the CMS 46 (within or connected to the aircraft computer/server 12). The CMS 46 then compares the new authorized configuration identity 166 to the AACI 160 to identify any differences. The CMS 46 sends a delta configuration report along line 168 to a data load system (DLS) 170. If the DLS 170 identifies that a safe status exists, the DLS 170 automatically initiates one or more software loads along one or more data transfer lines 172 into the aircraft systems 44. This process is repeated each time an updated authorized configuration identity is generated and uploaded to the CMS 46. As previously identified herein, existing interlocks 174 in the aircraft systems 44 prevent software or data being changed in any of the aircraft systems 44 at an inappropriate time. The DLS 170 may be an existing aircraft system which is modified per the present invention. The DLS 170 functionality may be distributed among the aircraft systems 44 including the CMS 46 instead of a stand-alone system.

Figure 10:
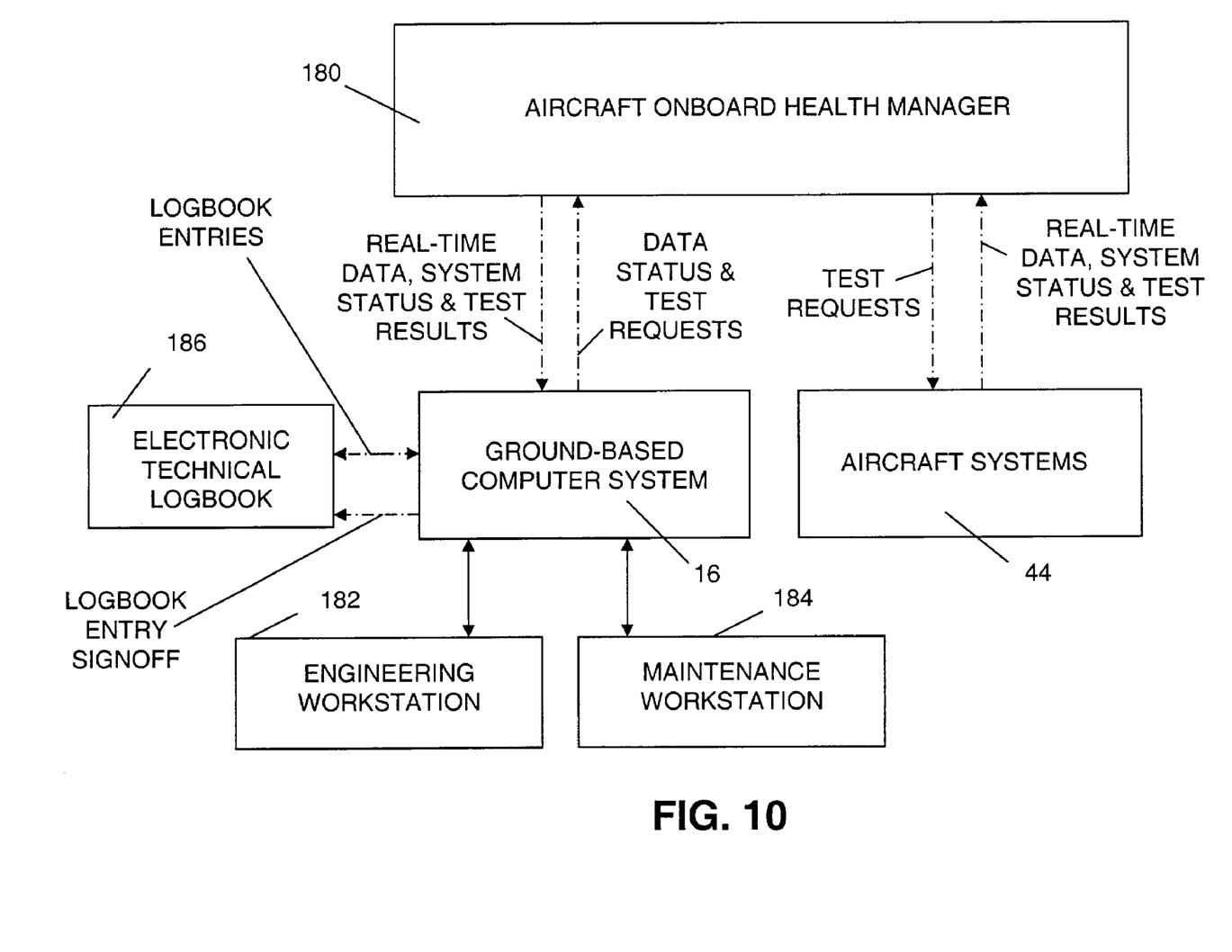
FIG. 10 is a block diagram of the present invention identifying steps to remotely assess an aircraft's health.

Referring to FIG. 10, in a preferred embodiment of the present invention, remote access for health assessment capabilities operates as follows. As known in the art, each aircraft system 44 can report status and transmit signals to an aircraft onboard health manager 180. The health manager 180 is an existing avionics system that collects and reports data on aircraft systems which is modified per the present invention to permit expanded functionality (e.g. more data, more tests, diagnostics) and real/-time data transfer to and from the health manager 180. In a preferred embodiment of the present invention, the health manager 180 consolidates the status reports and transmits them in real-time to the GBCS 16 via one of the signal paths previously described herein. This information is routed to exemplary locations such as an engineering workstation 182 and a maintenance workstation 184. The engineering workstation 182 and the maintenance workstation 184 exemplify two of a plurality of workstations which can be part of the organizational computer systems located at one or more of the aircraft manufacturer, the part supplier, and/or the airline, in addition to any other user authorized to connect into the system of the present invention. In these workstations, an authorized user can access and view reports, and can also initiate requests for additional status, real-time data, or diagnostic tests. The GBCS 16 transmits these requests to the health manager 180, which, depending on the request: 1) transmits the additional status; 2) initiates real-time transmission of selected signals; and/or 3) requests one of the aircraft systems 44 to perform a specific diagnostic test. The health manager 180 can consolidate, store and/or transmit the results of the diagnostic test(s).

An authorized user via the GBCS 16 can assess real-time status of sensed systems and determine if they conform to their basis of certification, or whether repair deferral is possible based on regulatory approval. This capability can be used as part of the formal process of returning an aircraft 11 to a state of airworthiness. A remote authorized user can view an entry on a technical logbook 186. The technical logbook 186 is a file which contains data required to maintain the airworthiness of the aircraft 11. The technical logbook 186 can be remotely maintained via the GBCS 16. If the problem can be fixed remotely, the procedure is conducted. If the problem is deferrable, the deferral is noted in the technical logbook 186. The authorized user is able to remotely affix appropriate certification data (e.g. airframe and power plant mechanic's license number) into the technical logbook 186, allowing the aircraft 11 to continue operations.

Figure 11:
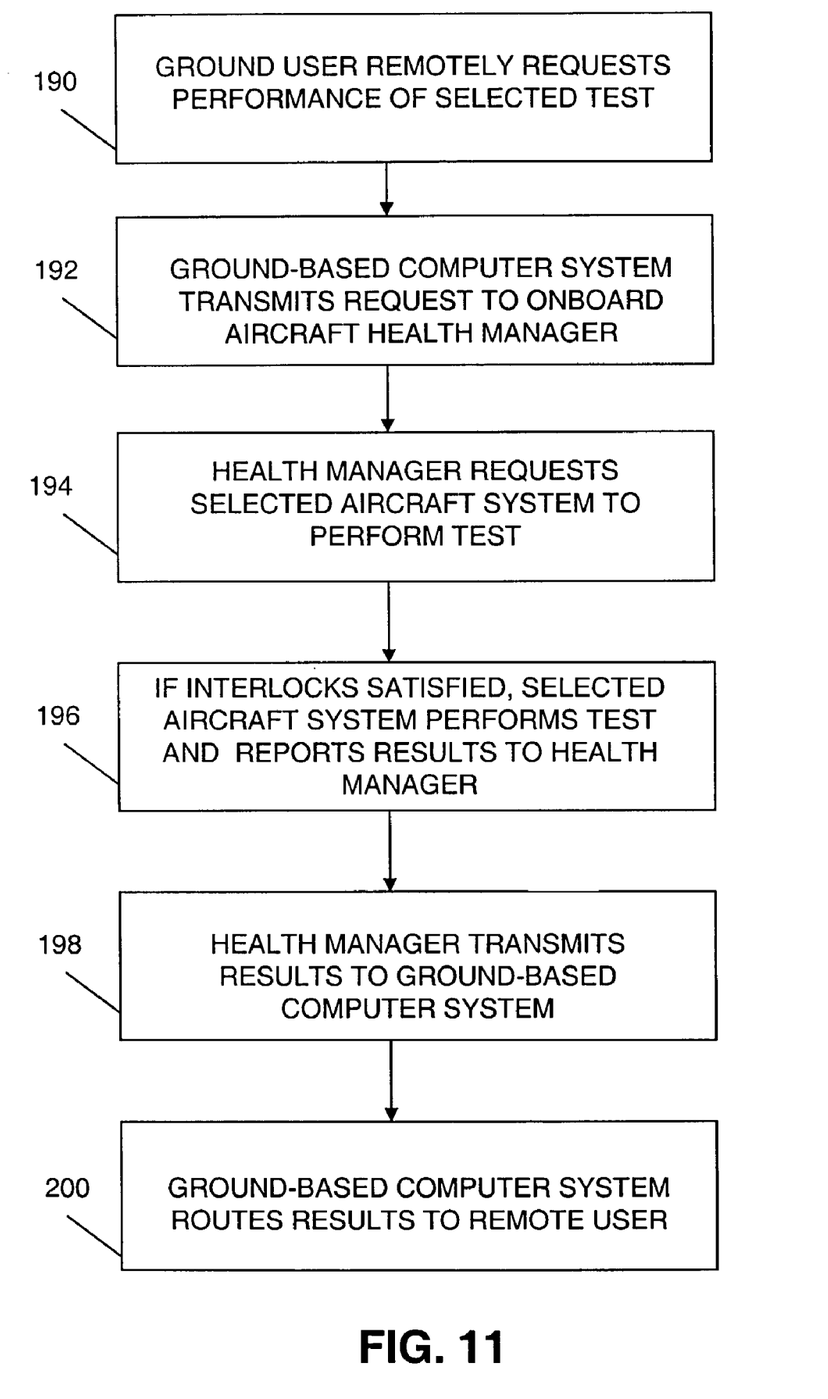
FIG. 11 is a block diagram of the present invention identifying steps to remotely perform diagnostic testing of an aircraft.

Referring to FIG. 11, the steps used to interact with the aircraft onboard health manager 180 described in FIG. 10 are detailed. At a step 190, an authorized ground user remotely requests performance of a specific test from one of a plurality of ground-based workstations. At a step 192, the GBCS 16 transmits the request to the onboard aircraft health manager 180. At a step 194, the health manager 180 requests the selected aircraft system to perform a test. At a step 196, if the aircraft systems 44 interlocks 174 (shown and discussed in reference to FIG. 9) are satisfied, the system performs the tests and reports the results to the health manager 180. At a step 198, the health manager 180 transmits the test results from step 196 to the GBCS 16. At a step 200, the GBCS 16 reports the test results to the ground-based user.

The system of the present invention provides several advantages. A wireless or hardwired transmission path is utilized to maintain, monitor, manufacture, manage and/or administer aircraft. Personnel can remotely monitor the real-time status of aircraft systems, even with the aircraft in flight. Two or more persons can simultaneously review aircraft data and perform maintenance actions. By providing aircraft configuration data electronically, the data is more easily accessed by personnel with the appropriate security clearance. Copies of software or data on physical media are no longer required to be stored on an aircraft and are no longer required to be delivered to the aircraft or airline for use in maintenance and loading.

The description of the invention is merely exemplary in nature and, thus, variations that do not depart from the gist of the invention are intended to be within the scope of the invention. Such variations are not to be regarded as a departure from the spirit and scope of the invention. For example, the present invention can apply to any mobile platform with computer systems. For example, in the description above, an aircraft is used as an example of a mobile platform. The aircraft industry processes, organizations, and regulatory requirements are used to explain the invention. Very similar processes and implementations can be applicable to other mobile platforms.

What is claimed is:

1. An aircraft wireless data communication system comprising:
   an aircraft having a plurality of aircraft systems;
   each of said aircraft systems having a system actual configuration identity;
   each said system actual configuration identity being transferable as a system actual configuration identity file;
   a computer and server being adaptable to electronically communicate with each of said plurality of aircraft systems;
   an aircraft data load system carried on said aircraft for determining when a condition exists during which modifications may be made to a selected one or more of said aircraft systems;
   each said system actual configuration identity file being combinable in said computer and server to form an aircraft actual configuration identity;
   said aircraft actual configuration identity being transferable as an aircraft actual configuration identity file; and
   said computer and server being in wireless communication with at least one ground-based network of computers, and further being in communication with said aircraft data load system;
   wherein any one of said ground-based network of computers is operable to one of:
     receive a real-time status of each of said aircraft systems; and
     send a data set to said computer and server;
   wherein said data set includes an authorized aircraft configuration identity transferable as an authorized aircraft configuration identity file;
   wherein said computer and server further comprises a configuration management subsystem, said configuration management subsystem being in communication with said aircraft systems and adaptable to retrievably obtain and report said actual aircraft configuration identity file;
   wherein said configuration management subsystem is adaptable to receive said authorized aircraft configuration identity file from said ground-based network of computers along one of a wireless signal path and a direct signal path; and
   the system further comprising an aircraft data load system wherein a difference determinable by said configuration management subsystem between said authorized aircraft configuration identity file and said actual aircraft configuration identity file is reportable to said aircraft data load system and to said ground-based network of computers.

2. A wireless communication system for communicating data between an aircraft and a ground-based computer network comprising:
   said aircraft having a plurality of aircraft systems, and a computer and server adapted to communicate with each of said plurality of aircraft systems;
   an aircraft data load system carried on said aircraft for determining when a condition exists during which modifications may be made to one or more of said aircraft systems;
   each of said aircraft systems having a system actual configuration identity;
   each said system actual configuration identity being collectively grouped to form an aircraft actual configuration identity;
   said computer and server being in wireless communication with at least one ground-based network of computers, and in communication with said aircraft data load system, and including at least an aircraft manufacturer network, an airline network, and a parts supplier network;
   each said network having a central linking computer electronically connectable with each of a plurality of individual computers;
   wherein each of said independent computers operates to receive a real-time status of said aircraft actual configuration identity;
   wherein said plurality of individual computers of said aircraft manufacturer network further comprises:
     at least one of an engineering group, a manufacturing group and a flight test group;
     a combined communication link between said engineering group, said manufacturing group and said flight test group; and
     an aircraft manufacturer communication link joining said combined communication link to said parts supplier network.

3. The system of claim 2, wherein said plurality of individual computers of said airline network further comprises at least one of an operations group and a maintenance group.

4. The system of claim 3, wherein said plurality of individual computers of said airline network further comprises:
   a combined communications link between said operations group and said maintenance group; and
   an airline organization communication link joining said combined communication link to said parts supplier network and said aircraft manufacturer network.

5. A method to communicate in real-time with an aircraft comprising the steps of:
   disposing a computer and server on said aircraft;
   connecting said computer and server with a plurality of aircraft systems of said aircraft;
   collecting a plurality of real-time system data from each of said plurality of systems in said computer and server;
   wirelessly communicating said plurality of real-time system data from said computer and server to a ground-based computer system;
   linking said ground-based computer system with a plurality of user computers;
   enabling each of said plurality of user computers to perform at least one of:
     reading said system data via said ground-based computer system;
     transmitting each of data and commands in real-time from each of said user computers via said ground-based computer system to said aircraft; and
     using an aircraft data load system carried on said aircraft to determine when a condition exists on said aircraft during which a selected one or more of said aircraft systems may be updated with data provided by one of said users,
   disposing a configuration management subsystem in said computer and server, and in each of said user computers;
   storing an authorized configuration identity files accessible by authorized ones of said user computers;
   transferring to said computer and server an undated authorized configuration identity file of said aircraft from one of said authorized user computers;
   identifying a difference between said aircraft actual configuration identity and said undated authorized aircraft configuration identity; and
   reporting said difference to both said ground-based computer system and to said aircraft data load system.

6. The method of claim 5, comprising automatically loading new software parts from said data load system to said aircraft systems when permitted by loading interlocks.

7. The method of claim 5, comprising manually loading new software parts from said data load system to said aircraft systems when permitted by loading interlocks.

8. A method for managing an aircraft configuration comprising the steps of:
- electronically identifying a set of aircraft parts, said parts including at least one of an electronic systems hardware configuration identity, an electronic systems software configuration identity, and an aircraft hardware configuration identity;
- combining said set of aircraft parts into an aircraft actual configuration identity report;
- wirelessly linking said aircraft actual configuration identity report to at least one ground-based computer;
- comparing said aircraft actual configuration identity report to an authorized aircraft configuration identity in said ground-based computer;
- identifying a difference between said aircraft actual configuration identity report and said authorized aircraft configuration identity;
- wirelessly transmitting software including said difference from said ground-based computer to an aircraft mounted computer and server; and
- initiating said software loading from authorized ones of said ground-based computers; and
- monitoring said software loading from said authorized ground-based computers.

9. The method of claim 8, further comprising:
- identifying each of a plurality of aircraft hardware components having configuration identity data; and
- disposing an electronic identification placard on each of said aircraft hardware components to electronically identify said configuration identity data.

10. The method of claim 9, further comprising:
- building a configuration report from said configuration identity data of each said electronic identification placard; and
- transmitting said configuration report to said ground-based computer.

11. The method of claim 10, further comprising disposing an electronic firewall between each of a plurality of aircraft systems and said computer and server.

12. The method of claim 11, further comprising securing said software, including a plurality of data items, before said transmitting step to said computer and server.

13. The method of claim 12, further comprising wirelessly performing a quality control comparison between the authorized aircraft configuration identity and the actual aircraft configuration identity report following the step of transmitting said software and said plurality of data items.

14. A wireless communication system for communicating data between an aircraft and a ground-based computer network comprising:
- said aircraft having a plurality of aircraft systems, and a computer and server adapted to communicate with each of said plurality of aircraft systems;
- an aircraft data load system carried on said aircraft for determining when a condition exists during which modifications may be made to one or more of said aircraft systems;
- each of said aircraft systems having a system actual configuration identity;
- each said system actual configuration identity being collectively grouped to form an aircraft actual configuration identity;
- said computer and server being in wireless communication with at least one ground-based network of computers, and in communication with said aircraft data load system, and including at least an aircraft manufacturer network, an airline network, and a parts supplier network;
- each said network having a central linking computer electronically connectable with each of a plurality of individual computers;
- wherein each of said independent computers operates to receive a real-time status of said aircraft actual configuration identity; and
- wherein an Internet communication link connectably joins said parts supplier network to said ground-based network of computers.

\* \* \* \* \*

UNITED STATES PATENT AND TRADEMARK OFFICE
CERTIFICATE OF CORRECTION

PATENT NO. : 7,636,568 B2 Page 1 of 1
APPLICATION NO. : 10/307818
DATED : December 22, 2009
INVENTOR(S) : Gould et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2150 days.

Signed and Sealed this

Ninth Day of November, 2010

David J. Kappos
*Director of the United States Patent and Trademark Office*